United States Patent
Iyoda et al.

(10) Patent No.: US 8,285,449 B2
(45) Date of Patent: Oct. 9, 2012

(54) DAMPING FORCE CONTROL APPARATUS FOR VEHICLE

(75) Inventors: Ikuhide Iyoda, Nissin (JP); Motohiko Honma, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 384 days.

(21) Appl. No.: 12/593,991

(22) PCT Filed: Jan. 5, 2009

(86) PCT No.: PCT/JP2009/050163
§ 371 (c)(1),
(2), (4) Date: Sep. 30, 2009

(87) PCT Pub. No.: WO2009/101825
PCT Pub. Date: Aug. 20, 2009

(65) Prior Publication Data
US 2010/0076649 A1    Mar. 25, 2010

(30) Foreign Application Priority Data
Feb. 12, 2008  (JP) .................................. 2008-29924

(51) Int. Cl.
B60G 17/00 (2006.01)
(52) U.S. Cl. .......................................... 701/38; 303/140
(58) Field of Classification Search .................... 701/37, 701/38, 72, 75; 280/5.5, 5.501, 5.502, 5.506, 280/5.51, 5.512, 5.507, 6.15, 5.515, 5.508, 280/5.513; 303/140, 146
See application file for complete search history.

(56) References Cited

U.S. PATENT DOCUMENTS

| 5,072,392 | A | 12/1991 | Taniguchi |
| 5,485,417 | A | 1/1996 | Wolf et al. |
| 5,570,289 | A | 10/1996 | Stacey et al. |
| 5,911,768 | A | 6/1999 | Sasaki |
| 6,219,602 | B1 | 4/2001 | Badenoch et al. |

(Continued)

FOREIGN PATENT DOCUMENTS

DE         4136224 A1    8/1992

(Continued)

OTHER PUBLICATIONS

Office action from corresponding German Patent Application No. 11 2009 000 316.8 dated Jun. 12, 2012 and English language translation thereof.

*Primary Examiner* — Dalena Tran
(74) *Attorney, Agent, or Firm* — Gifford, Krass, Sprinkle, Anderson & Citkowski, P.C.

(57) ABSTRACT

A suspension ECU computes an actual roll angle and an actual pitch angle of a vehicle, and computes a difference between a target pitch angle and the actual pitch angle. The ECU then computes a total demanded damping force which must be cooperatively generated by shock absorbers so as to decrease the computed difference to zero, and distributes the total demanded damping force in proportion to the magnitude of a lateral acceleration such that a demanded damping force on the turn-locus inner side becomes greater than a demanded damping force on the turn-locus outer side. Further, the ECU determines whether or not the vehicle body is vibrating in the vertical direction as a result of input of a road surface disturbance, calculates a vibration-suppressing damping force needed for damping the vibration, and determines the demanded damping forces by use of the vibration-suppressing damping force.

12 Claims, 6 Drawing Sheets

U.S. PATENT DOCUMENTS 6,859,702 B2 * 2/2005 Kawashima et al. ............ 701/37
7,427,072 B2 * 9/2008 Brown ........................... 280/5.5

FOREIGN PATENT DOCUMENTS

| | | | |
|---|---|---|---|
| FR | 2888781 | A1 | 1/2007 |
| JP | 06048147 | A | 2/1994 |
| JP | 6099714 | A | 4/1994 |
| JP | 11129723 | A | 5/1999 |
| JP | 11151923 | A | 6/1999 |
| JP | 11268512 | A | 10/1999 |
| JP | 2007008373 | A | 1/2007 |

* cited by examiner

DAMPING FORCE CONTROL APPARATUS FOR VEHICLE

TECHNICAL FIELD

The present invention relates to a damping force control apparatus for a vehicle which changes and controls damping forces of shock absorbers disposed between the vehicle body and wheels.

BACKGROUND ART

There have actively been proposed apparatuses and methods which change and control damping forces of shock absorbers disposed between the vehicle body and wheels. For example, Japanese Patent Application Laid-Open (kokai) No. 2007-8373 (Patent Document 1) discloses a suspension-characteristic computation method which provides a design index of a suspension in consideration of the correlation between roll and pitch generated in the vehicle body. In this suspension-characteristic computation method, a pitch moment determined by the geometries of suspensions is computed as the sum of a front-wheel-side ascending/descending force and a rear-wheel-side ascending/descending force. The front-wheel-side ascending/descending force is represented by the product of a front-wheel-side geometry proportional coefficient and the square of a tire lateral force. The rear-wheel-side ascending/descending force is represented by the product of a rear-wheel-side geometry proportional coefficient and the square of a tire lateral force. Further, a pitch moment determined by damping forces of the suspensions is computed from the product of a damping force proportional coefficient and a roll rate. A pitch angle is then computed from the sum of the two calculated pitch moments and the product of the gain and phase delay of the pitch angle in relation to the pitch moment, and a phase difference between the pitch angle and the roll angle is computed on the basis of this computed pitch angle.

In the case where suspensions are designed in accordance with such a suspension-characteristic computation method, the timings of generations of a roll and a pitch can be synchronized through proper setting of an expansion difference and a contraction difference between shock absorbers disposed on the front wheel side and shock absorbers disposed on the rear wheel side. As a result, maneuvering stability can be improved.

Further, Japanese Patent Application Laid-Open (kokai) No. H06-99714 (Patent Document 2) discloses a vehicle suspension apparatus which can perform active roll suppression control in accordance with the roll direction of the vehicle body by use of only a steering sensor. In this vehicle suspension apparatus, when a steering angle detected by the steering sensor exceeds a predetermined neutral threshold, control is switched into a roll control mode for controlling left and right shock absorbers to have large damping forces during expansion or contraction thereof, on the basis of the roll direction of the vehicle body determined from the polarity of a steering angular speed. For a reverse steering performed thereafter, the apparatus controls the damping forces of the left and right shock absorbers such that their damping forces change in a direction opposite the direction in which the damping forces are changed in the above-described roll control mode, when the polarity of the steering angular velocity reverses.

Further, Japanese Patent Application Laid-Open (kokai) No. H06-48147 (Patent Document 3) discloses a vehicle suspension apparatus which suppresses roll stemming from abrupt steering, and prevents riding quality from deteriorating when a steering operation is performed. In this vehicle suspension apparatus, a control signal is calculated from a bounce rate based on sprung-portion ascending/descending speed, a pitch rate detected from a difference of sprung-portion ascending/descending speed between the front and rear sides of the vehicle body, and a roll rate detected from a difference of sprung-portion ascending/descending speed between the left and right sides of the vehicle body. When the control signal is equal to or greater than a predetermined large threshold, the damping forces of shock absorbers on the expansion side (the side corresponding to the steering direction) are increased, and the damping forces of shock absorbers on the contraction side (the side opposite the side corresponding to the steering direction) are decreased. Further, when the control signal is equal to or less than a predetermined small threshold, the damping forces of shock absorbers on the expansion side are decreased, and the damping forces of shock absorbers on the contraction side are increased.

DISCLOSURE OF THE INVENTION

Incidentally, it is generally said that, in order to secure maneuvering stability during turning of the vehicle, the timing of generation of a roll and that of a pitch are desired to be synchronized, as taught in Patent Document 1. Further, it is said that the vehicle is desired to have a pitch angle such that the front of the vehicle slightly descends. Moreover, in general, when a vehicle turns, as taught in Patent Documents 2 and 3, damping forces of shock absorbers disposed on the inner side of a turning locus of the center of the vehicle (hereinafter simply referred to as the "turn-locus inner side") are increased, and damping forces of shock absorbers disposed on the outer side of the turning locus (hereinafter simply referred to as the "turn-locus outer side") are decreased, whereby the posture of the vehicle is controlled so as to lower a sprung portion (the vehicle body).

However, if a force is input to the vehicle body of a vehicle due to a bump or depression on a road surface (disturbance from the road surface (hereinafter referred to as a "road surface disturbance")) when the vehicle turns in a state in which the damping forces of shock absorbers disposed on the turn-locus inner side are increased, and the damping forces of shock absorbers disposed on the turn-locus outer side are decreased as disclosed in Patent Documents 2 and 3, an unnecessary vibration is generated in the vehicle body. In particular, since the damping forces of the shock absorbers disposed on the turn-locus outer side are small, these shock absorbers cannot quickly converge the generated vibration, which may adversely affect the maneuvering stability of the vehicle. Therefore, vibrations generated in the vehicle upon input of road surface disturbances must be properly suppressed; i.e., quickly damped.

The present invention has been achieved to solve the above problems, and an object of the invention is to provide a damping force control apparatus for a vehicle which can quickly converge a change in the posture of the vehicle during a turn due to input of a road surface disturbance, to thereby secure satisfactory maneuvering stability.

In order to achieve the above-described object, the present invention provides a damping force control apparatus for a vehicle which changes and controls damping forces of shock absorbers disposed between a vehicle body and wheels. The damping force control apparatus comprises physical quantity detection means, damping-force determination means, damping-force control means, vertical movement determination means, and vibration-suppressing-damping-force determination means. The physical quantity detection means detects a predetermined physical quantity which changes with turning of the vehicle. The damping-force determination means determines damping forces of shock absorbers disposed on a turn-locus inner side and damping forces of shock absorbers disposed on a turn-locus outer side in accordance with the detected predetermined physical quantity such that the damping forces of the shock absorbers disposed on the turn-locus inner side become greater than the damping forces of the shock absorbers disposed on the turn-locus outer side. The damping-force control means changes and controls the damping forces of the shock absorbers on the basis of the determined damping forces of the shock absorbers disposed on the turn-locus inner side and the determined damping forces of the shock absorbers disposed on the turn-locus outer side. The vertical movement determination means determines whether the vehicle body is moving in the vertical direction as a result of input of a road surface disturbance during the turning in a state in which the damping forces of the shock absorbers disposed on the turn-locus inner side and the damping forces of the shock absorbers disposed on the turn-locus outer side have been determined by the damping-force determination means. The vibration-suppressing-damping-force determination means determines a vibration-suppressing damping force which is necessary for suppressing the vertical movement of the vehicle body determined by the vertical movement determination means and which must be generated by at least the shock absorbers disposed on the turn-locus outer side. When the vertical movement determination means determines that the vehicle body is moving in the vertical direction, the damping-force determination means subtracts the vibration-suppressing damping force determined by the vibration-suppressing-damping-force determination means from the determined damping forces of the shock absorbers disposed on the turn-locus inner side, and adds the vibration-suppressing damping force determined by the vibration-suppressing-damping-force determination means to the determined damping forces of the shock absorbers disposed on the turn-locus outer side to thereby determine the damping forces of the shock absorbers disposed on the turn-locus inner side and the damping forces of the shock absorbers disposed on the turn-locus outer side.

In this case, preferably, the predetermined physical quantity detected by the physical quantity detection means is at least one of a lateral acceleration generated as a result of turning of the vehicle, a yaw rate generated as a result of turning of the vehicle, and an operation amount of a steering wheel operated by a driver. Further, preferably, the vertical movement determination means determines that the vehicle is moving in the vertical direction on the basis of at least one of a vertical acceleration generated in the vehicle body, stroke amounts of the shock absorbers, and the period of a vertical vibration generated in the vehicle body. Moreover, preferably, each shock absorber includes an electrical actuator which is electrically operated and controlled so as to change the damping force of the shock absorber, and the damping force control means electrically operates and controls the electrical actuators of the shock absorbers such that the damping forces of the shock absorbers disposed on the turn-locus inner side become greater than the damping forces of the shock absorbers disposed on the turn-locus outer side.

In this case, preferably, the damping-force determination means comprises total-damping-force calculation means for calculating a total damping force which must be cooperatively generated by left and right shock absorbers disposed on the front-wheel side of the vehicle and left and right shock absorbers disposed on the rear-wheel side of the vehicle so as to control a roll generated in the vehicle body as a result of turning of the vehicle; and total-damping-force distribution means for distributing the calculated total damping force to the shock absorbers disposed on the turn-locus inner side and the shock absorbers disposed on the turn-locus outer side in accordance with the detected predetermined physical quantity such that the damping forces of the shock absorbers disposed on the turn-locus inner side become greater than the damping forces of the shock absorbers disposed on the turn-locus outer side.

Preferably, the total-damping-force calculation means computes an actual roll angle and an actual pitch angle generated in the vehicle body, determines a target pitch angle corresponding to the computed actual roll angle on the basis of a previously set correlation between roll angle and pitch angle, computes a difference between the determined target pitch angle and the computed actual pitch angle, and calculates the total damping force such that the computed difference become about zero in order to control the roll generated in the vehicle body while synchronizing the phases of the actual roll angle and the actual pitch angle.

Further, preferably, when the vertical movement determination means determines that the vehicle body is moving in the vertical direction as a result of input of a road surface disturbance to the shock absorbers disposed on the turn-locus outer side, the total-damping-force distribution means distributes the total damping force to the shock absorbers disposed on the turn-locus inner side.

Further, preferably, the total-damping-force distribution means distributes the calculated total damping force to the shock absorbers disposed on the turn-locus inner side and the shock absorbers disposed on the turn-locus outer side in proportion to the detected predetermined physical quantity such that the damping forces of the shock absorbers disposed on the turn-locus inner side become greater than the damping forces of the shock absorbers disposed on the turn-locus outer side.

In this case, more specifically, the total-damping-force distribution means equally distributes the calculated total damping force to the shock absorbers disposed on the turn-locus inner side and the shock absorbers disposed on the turn-locus outer side, adds a damping force distribution amount, which is proportional to the detected predetermined physical quantity, to the damping force distributed to the shock absorbers disposed on the turn-locus inner side, and subtracts the damping force distribution amount from the damping force distributed to the shock absorbers disposed on the turn-locus outer side, such that the damping forces of the shock absorbers disposed on the turn-locus inner side become greater than the damping forces of the shock absorbers disposed on the turn-locus outer side.

By virtue of the above configuration, in order to control the roll generated when the vehicle turns while synchronizing the phases of the actual roll angle and the actual pitch angle of the vehicle body, the damping forces of the shock absorbers disposed on the turn-locus inner side and the damping forces of the shock absorbers disposed on the turn-locus outer side can be controlled such that the former damping forces are greater than the latter damping forces, in accordance with the magnitude of the predetermined physical quantity (lateral acceleration, yaw rate, operation amount of the steering wheel, etc.), which changes with turning of the vehicle.

More specifically, the damping-force determination means can calculate the total damping force which must be cooperatively generated by left and right shock absorbers disposed on the front-wheel side and the rear-wheel side, respectively, of the vehicle so as to control the roll. Further, the damping-force determination means can distribute the calculated total damping force to the shock absorbers disposed on the turn-locus inner side and the shock absorbers disposed on the turn-locus outer side in accordance with the predetermined physical quantity such that the former damping forces become greater than the latter damping forces.

When the total damping force is distributed to the shock absorbers disposed on the turn-locus inner side and the shock absorbers disposed on the turn-locus outer side in order to control the roll, the total damping force may be divided to the shock absorbers disposed on the turn-locus inner side and the shock absorbers disposed on the turn-locus outer side in proportion to the predetermined physical quantity. In this case, the total-damping-force distribution means may equally distribute the total damping force to the shock absorbers disposed on the turn-locus inner side and the shock absorbers disposed on the turn-locus outer side; calculate a distribution amount, which is proportional to the predetermined physical quantity; and add the distribution amount to the damping force of the shock absorbers disposed on the turn-locus inner side and subtract the distribution amount from the damping force of the shock absorbers disposed on the turn-locus outer side, such that the damping forces of the shock absorbers disposed on the turn-locus inner side become greater than the damping forces of the shock absorbers disposed on the turn-locus outer side.

As described above, once the damping-force determination means determines the damping forces of the shock absorbers disposed on the turn-locus inner side and the damping forces of the shock absorbers disposed on the turn-locus outer side, the damping-force control means can electrically control the electrical actuators provided in the shock absorbers. Thus, the shock absorbers disposed on the turn-locus inner side and the shock absorbers disposed on the turn-locus outer side can generate the determined damping forces, respectively.

By virtue of the above configuration, it is possible to considerably accurately determine damping forces which must be generated by the shock absorbers disposed on the turn-locus inner side and the shock absorbers disposed on the turn-locus outer side in order to control the roll while synchronizing the phases of the actual roll angle and the actual pitch angle of the vehicle body. Further, through addition and subtraction of the distribution amount which is proportional to the predetermined physical quantity, it becomes possible to maintain a state in which the damping forces of the shock absorbers disposed on the turn-locus inner side are greater than the damping forces of the shock absorbers disposed on the turn-locus outer side (i.e., maintain a proper rolled state), while generating the total demanded damping force which is demanded for the left and right absorbers disposed on the front wheel side in order to control the roll. Accordingly, the roll can be controlled more accurately by making constant the posture changing behavior of the vehicle during a turn, whereby the maneuvering stability of the vehicle can be improved greatly.

Incidentally, in a state in which the roll is controlled by means of determining the damping forces of the shock absorbers disposed on the turn-locus inner side to be greater than the damping forces of the shock absorbers disposed on the turn-locus outer side, determination as to whether the vehicle body is moving in the vertical direction as a result of input of a road surface disturbance can be determined on the basis of, for example, an vertical acceleration, stroke amounts of the shock absorbers, or the period of a vertical vibration. When the vehicle is moving in the vertical direction, there can be determined a vibration-suppressing damping force which must be generated by at least the shock absorbers disposed on the turn-locus outer side in order to suppress the vertical movement of the vehicle body, and the damping forces of the shock absorbers disposed on the turn-locus inner side and the damping forces of the shock absorbers disposed on the turn-locus outer side can be determined in consideration of the vibration-suppressing damping force.

More specifically, in a situation where a road surface disturbance is input to the shock absorbers disposed on the turn-locus inner side and the shock absorbers disposed on the turn-locus outer side in the same phase, the vibration-suppressing damping force is subtracted from the damping forces of the shock absorbers disposed on the turn-locus inner side determined to control the roll, and is added to the damping forces of the shock absorbers disposed on the turn-locus outer side determined to control the roll, whereby the damping forces of the shock absorbers disposed on the turn-locus inner side and the damping forces of the shock absorbers disposed on the turn-locus outer side can be determined. Further, in particular, in a case where the vehicle body is moving vertically as a result of input of a road surface disturbance only to the shock absorbers disposed on the turn-locus outer side and controlled to produce small damping forces, the vibration-suppressing damping force is subtracted from the total damping force distributed to the shock absorbers disposed on the turn-locus inner side, and the damping forces of the shock absorbers disposed on the turn-locus outer side are controlled to the vibration-suppressing damping force, whereby the damping forces of the shock absorbers disposed on the turn-locus inner side and the damping forces of the shock absorbers disposed on the turn-locus outer side can be determined.

According, when the vehicle body is moving vertically as a result of input of a road surface disturbance, the unnecessary vertical movement of the vehicle body can be damped quickly by correcting the total damping force, required to control the roll, in consideration of the vibration-suppressing damping force (through addition or subtraction of the vibration-suppressing damping force). As a result, satisfactory maneuvering stability can be secured.

BEST MODE FOR CARRYING OUT THE INVENTION a. First Embodiment

Figure 1:
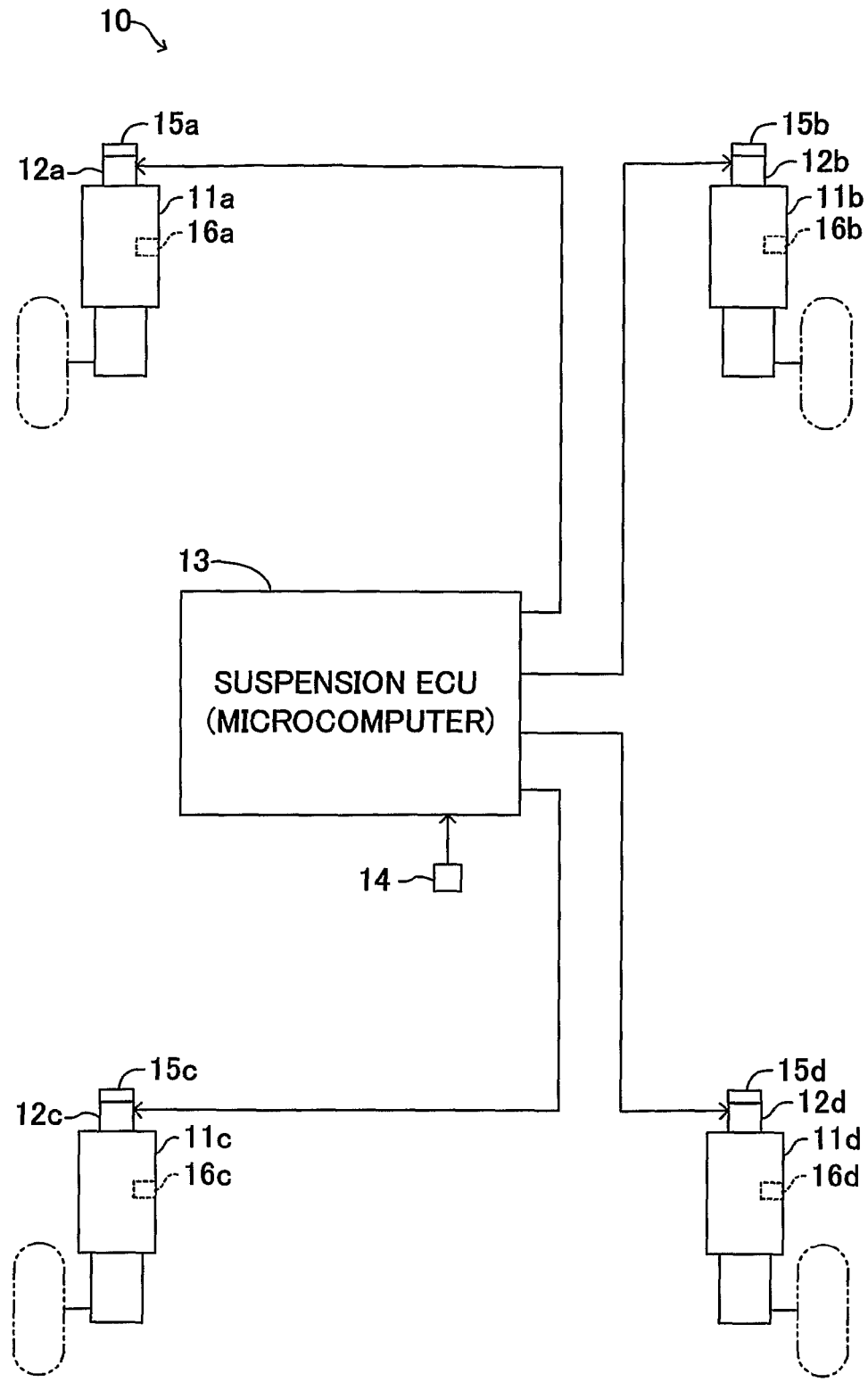
FIG. 1 is a schematic view showing the configuration of a damping force control apparatus for a vehicle common among embodiments of the present invention.

A damping force control apparatus for a vehicle (hereinafter referred to as a "vehicular damping force control apparatus") according to an embodiment of the present embodiment will now be described in detail with reference to the drawings. FIG. 1 schematically shows the configuration of a vehicular damping force control apparatus 10 common among embodiments of the present invention. This vehicular damping force control apparatus 10 includes shock absorbers 11a, 11b, 11c, and 11d which connect a vehicle body and wheels (left and right front wheels and left and right rear wheels) of the vehicle.

The shock absorbers 11a, 11b, 11c, and 11d include rotary valves (electrical actuators) 12a, 12b, 12c, and 12d, each of which changes seamlessly, for example, the diameter of a flow path for working fluid (oil, high-pressure gas, etc.). Although detailed description will be omitted, each of the rotary valves 12a, 12b, 12c, and 12d includes an unillustrated electrical drive means (e.g., an electric motor, a solenoid, or the like). A suspension electric control unit 13 (hereinafter simply referred to as an "ECU 13") electrically controls the rotary valves 12a, 12b, 12c, and 12d so as to change the diameters of the corresponding flow paths for the working fluid, to thereby seamlessly change the damping force characteristics of the shock absorbers 11a, 11b, 11c, and 11d.

The suspension ECU 13 is a microcomputer which includes a CPU, ROM, RAM, etc., as main components, and which changes the damping forces of the shock absorbers 11a, 11b, 11c, and 11d, when necessary, by executing various programs, including a roll control program to be described later.

Figure 2:
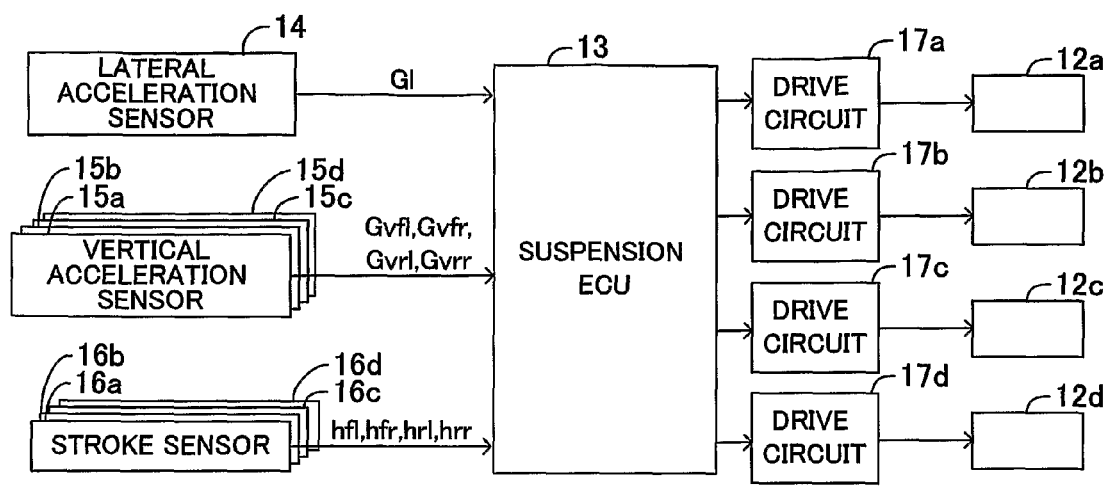
FIG. 2 is an explanatory view showing connections between a suspension ECU and various sensors and drive circuits in FIG. 1.

In order to control the damping forces of the shock absorbers 11a, 11b, 11c, and 11d as described above, a lateral acceleration sensor (physical quantity detection means) 14 for detecting lateral acceleration (a predetermined physical quantity) generated in the vehicle is connected to the input side of the suspension ECU 13, as shown in FIG. 2. The lateral acceleration sensor 14, which is disposed at, for example, the centroid of the vehicle as schematically shown in FIG. 1, is configured to detect an acceleration generated in the lateral direction of the vehicle and output the detected acceleration to the suspension ECU 13 as a lateral acceleration Gl. The lateral acceleration sensor 14 outputs, as a positive value, the lateral acceleration Gl generated when the vehicle in a straight traveling state turns leftward (hereinafter simply referred to as making a "leftward turn"), and outputs, as a negative value, the lateral acceleration Gl generated when the vehicle in a straight traveling state turns rightward (hereinafter simply referred to as making a "rightward turn").

Further, vertical acceleration sensors 15a, 15b, 15c, and 15d and stroke sensors 16a, 16b, 16c, and 16d, which constitute vertical movement determination means for determining a vertical movement generated in the vehicle, are connected to the input side of the suspension ECU 13 as shown in FIG. 2. As shown in FIG. 1, the vertical acceleration sensors 15a to 15d are assembled to the vehicle body in the vicinity of the respective shock absorbers 11a, 11b, 11c, and 11d. The vertical acceleration sensors 15a to 15d detect accelerations in the vertical direction generated at the positions where they are assembled, and output the detected accelerations to the suspension ECU 13 as vertical accelerations Gvfl, Gvfr, Gvrl, and Gvrr. The vertical acceleration sensors 15a to 15d output, as positive values, the vertical accelerations Gvfl, Gvfr, Gvrl, and Gvrr generated in the vehicle downward direction, and output, as negative values, the vertical accelerations Gvfl, Gvfr, Gvrl, and Gvrr generated in the vehicle upward direction.

The stroke sensors 16a to 16d, which are respectively assembled to the shock absorbers 11a, 11b, 11c, and 11d as shown in FIG. 1, detect stroke amounts of the respective shock absorbers 11a, 11b, 11c, and 11d, and output the respective detected stroke amounts to the suspension ECU 13 as the stroke amounts hfl, hfr, hrl, and hrr. Herein, the stroke sensors 16a to 16d detect the stroke amounts from reference stroke positions that have been set in advance for the shock absorbers 11a, 11b, 11c, and 11d, respectively. For example, the stroke sensors 16a to 16d output, as positive values, the stroke amounts hfl, hfr, hrl, and hrr in the direction in which the shock absorbers 11a, 11b, 11c, and 11d contract, and output, as negative values, the stroke amounts hfl, hfr, hrl, and hrr in which the shock absorbers 11a, 11b, 11c, and 11d expand.

Meanwhile, drive circuits 17a, 17b, 17c, and 17d for controlling operations of the rotary valves 12a, 12b, 12c, and 12d are connected to the output side of the suspension ECU 13, as shown in FIG. 2. This configuration enables the suspension ECU 13 to control the damping force characteristics of the shock absorbers 11a, 11b, 11c, and 11d.

Next, operation of the vehicular damping force control apparatus 10 having the above-described configuration will be described in detail.

Figure 3:
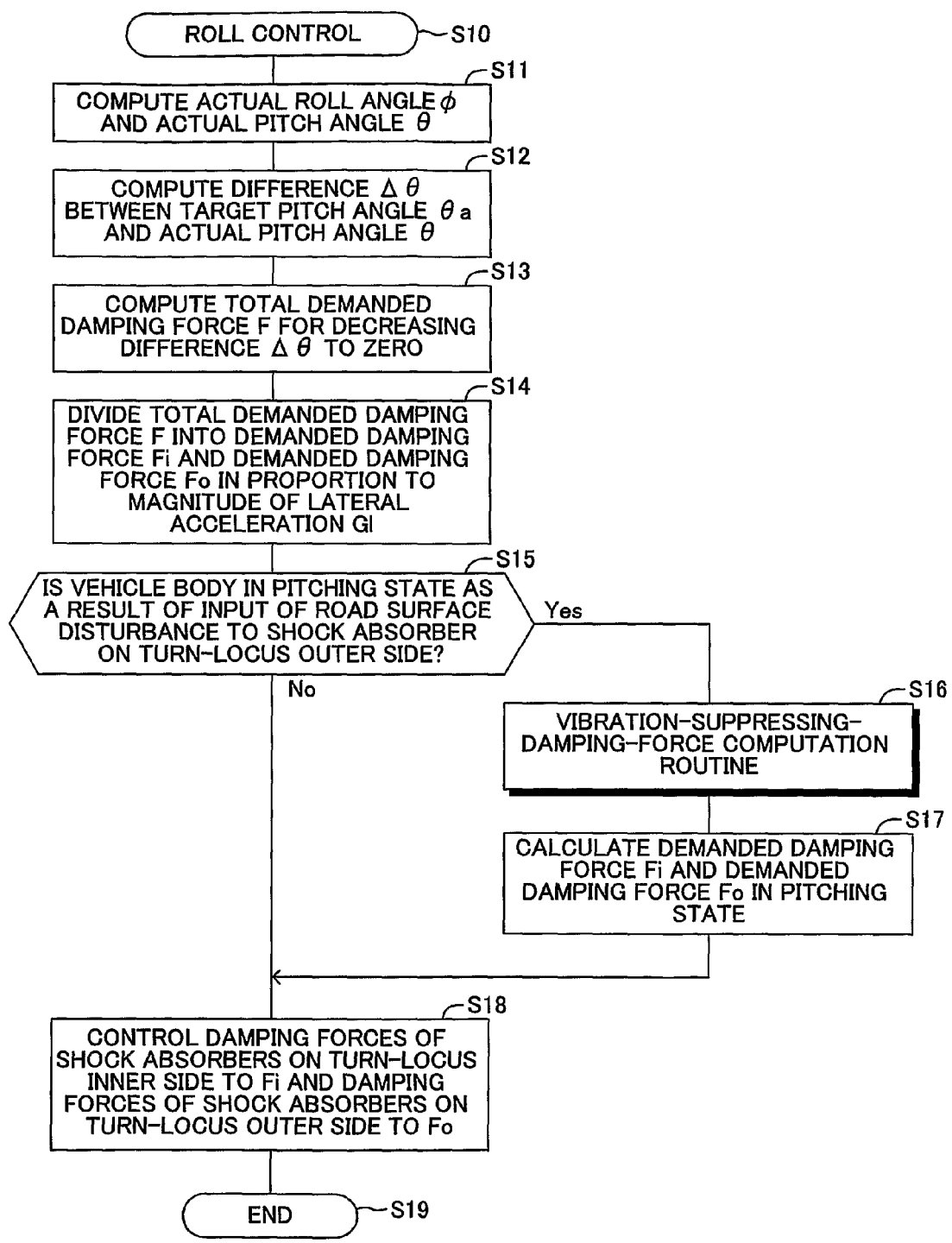
FIG. 3 relates to a first embodiment of the present invention and is a flowchart of a roll control program executed by the suspension ECU of FIG. 1.

When a driver rotates an unillustrated steering wheel and the vehicle enters a turning state, the suspension ECU 13 starts execution of the roll control program shown in FIG. 3 from step S10. In step S11 subsequent thereto, the suspension ECU 13 computes an actual roll angle φ and an actual pitch angle θ generated in the vehicle body. Since a computation method employed by the suspension ECU 13 so as to compute the actual roll angle φ and the actual pitch angle θ is well known, a detailed description thereof will be omitted. However, the computation method will be simply described as an example.

The actual roll angle φ can be generally represented by the following Eq. 1.

$$\phi = A \cdot \sin \omega t \qquad \text{Eq. 1}$$

where A represents a predetermined proportional constant, and ω represents the fundamental frequency of the roll angle (corresponding to, for example, the steering frequency of the steering wheel).

Since the actual pitch angle θ is generally proportional to the square of the actual roll angle φ, the actual pitch angle θ can be represented by the following Eq. 2, which uses the actual roll angle φ calculated in accordance with Eq. 1.

$$\theta = B \cdot \phi^2 \qquad \text{Eq. 2}$$

where B represents a predetermined proportional constant.

After completion of the calculation of the actual roll angle φ and the actual pitch angle θ in accordance with Eqs. 1 and 2, the suspension ECU 13 proceeds to step S12. Needless to say, instead of calculating the actual roll angle φ and the actual pitch angle θ through the above-described computation processing or estimation computation processing, the actual roll angle φ and the actual pitch angle θ may be directly detected by use of, for example, a roll angle sensor for detecting the actual roll angle φ generated in the vehicle and a pitch angle sensor for detecting the actual pitch angle θ generated in the vehicle.

In step S12, the suspension ECU 13 calculates a difference Δθ between a target pitch angle θa and the actual pitch angle θ by reference to a target map which shows the correlation between roll angle and pitch angle determined such that the vehicle has satisfactory maneuvering stability at the time of turning. This calculation will now be described in detail.

In general, in order to improve the maneuvering stability at the time when the vehicle turns, it is said to be effective to synchronize the generation timings of a roll and a pitch generated in the vehicle body in a turning state. That is, when a vehicle which is excellent in maneuvering stability is in a turning state, a roll and a pitch tend to be simultaneously generated in the vehicle body; and when a vehicle which is poor in maneuvering stability is in a turning state, a roll and a pitch tend to be generated in the vehicle body with a time difference therebetween. This means that the greater the degree of maneuvering stability of a vehicle, the smaller the phase difference between the roll angle and the pitch angle generated in the vehicle body.

That is, in a vehicle which is excellent in maneuvering stability, the phase difference between the roll angle and the pitch angle tends to become small. This means that the pitch angle changes with a very small hysteresis in relation to a change in the roll angle. Meanwhile, in a vehicle which is poor in maneuvering stability, the phase difference between the roll angle and the pitch angle tends to become large. This means that the pitch angle changes with a large hysteresis in relation to a change in the roll angle.

Figure 4:
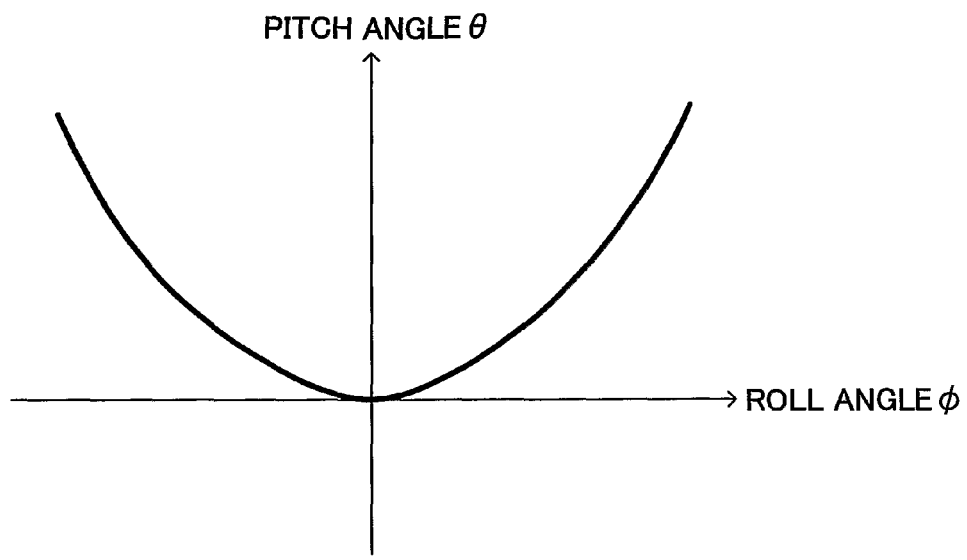
FIG. 4 is a graph showing the relation between roll angle and pitch angle.

Therefore, in order to improve the maneuvering stability of the vehicle, the roll angle and the pitch angle are desired to have a correlation as shown in FIG. 4; i.e., the pitch angle changes with a very small hysteresis in relation to a change in the roll angle. Incidentally, in general, a vehicle in a turning state travels while generating a roll by descending a portion of the sprung portion (i.e., the vehicle body) on the turn-locus outer side. Accordingly, controlling the pitch angle is effective in order to attain satisfactory maneuvering stability for a change in the generated roll angle.

Figure 5:
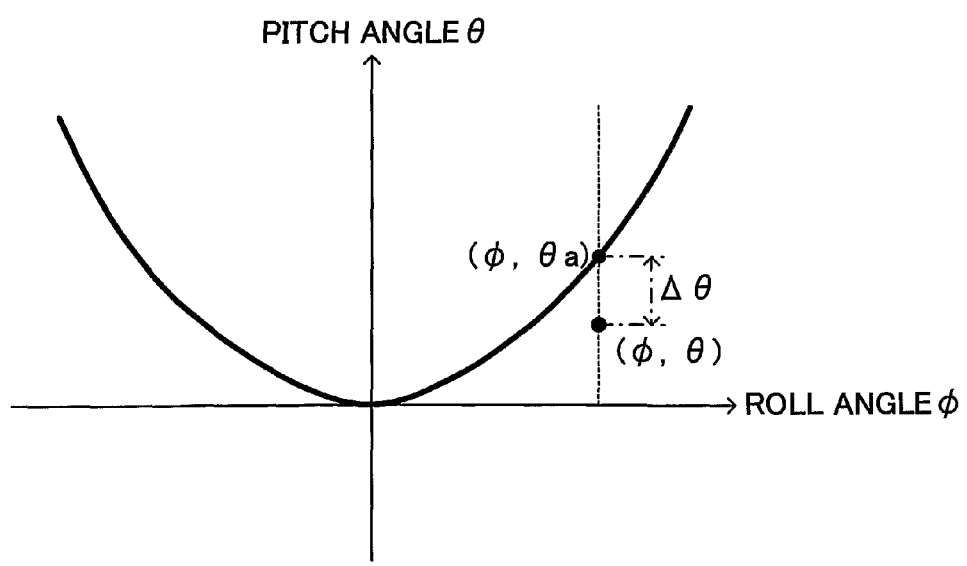
FIG. 5 is an explanatory view showing a method of determining a target pitch angle.

In this case, the suspension ECU 13 can perform roll control for securing satisfactory maneuvering stability, if the suspension ECU 13 employs, as a target map, a map representing the relation shown in FIG. 4, determines the target pitch angle θa corresponding to the actual roll angle φ generated in the vehicle body in a turning state by reference to the target map, and renders the actual pitch angle θ coincident with the target pitch angle θa. Therefore, as shown in FIG. 5, the suspension ECU 13 calculates the difference Δθ between the actual pitch angle θ and the target pitch angle θa corresponding to the actual roll angle φ. After completion of the calculation of the difference Δθ, the suspension ECU 13 proceeds to step S13.

In step S13, the suspension ECU 13 calculates a total demanded damping force F for the front-wheel-side left and right shock absorbers 11a and 11b and the rear-wheel-side left and right shock absorbers 11c and 11d, which is required to reduce the difference Δθ to "0"; i.e., render the actual pitch angle θ coincident with the target pitch angle θa. Calculation of this total demanded damping force F will be described below. However, since any of various known methods can be employed for the calculation, a detailed description therefor will be omitted, and the calculation will be simply described as an example.

The pitch angle generated in the vehicle body is generated because of a pitch moment M in the longitudinal direction of the vehicle body. Therefore, the total demanded damping force F needed for controlling the pitch angle generated in the vehicle body can be calculated by use of the pitch moment M.

The pitch moment M can be calculated by the following Eq. 3.

$$M = I \cdot (\Delta\theta)'' + C \cdot (\Delta\theta)' + K \cdot (\Delta\theta) \qquad \text{Eq. 3}$$

where I represents an inertia moment, C represents a damping coefficient, and K represents a spring constant. Further, in Eq. 3, $(\Delta\theta)''$ represents the second derivative value of the difference Δθ calculated in the above-mentioned step S12, and $(\Delta\theta)'$ represents the first derivative value of the difference Δθ.

The total demanded damping force F can be calculated by dividing the pitch moment M in the longitudinal direction of the vehicle body represented by Eq. 3, by a wheel base L of the vehicle. That is, the total demanded damping force F can be calculated by the following Eq. 4.

$$F = M/L \qquad \text{Eq. 4}$$

Upon completion of the calculation of the total demanded damping force F, the suspension ECU 13 proceeds to step S14.

In step S14, the suspension ECU 13 executes a distribution computation for distributing the total demanded damping force F calculated in the above-described step S13 between the front-wheel-side left and right shock absorbers 11a and 11b and between the rear-wheel-side left and right shock absorbers 11c and 11d. Notably, since similar calculation is performed for both the front wheel side and the rear wheel side, in the following description, the description will be provided for the front-wheel-side left and right shock absorbers 11a and 11b only and provided for the case where the vehicle makes a leftward turn.

For distribution of the total demanded damping force F to the left and right shock absorbers 11a and 11b, the suspension ECU 13 uses a distribution amount X which is proportional to the magnitude of the lateral acceleration Gl generated in the vehicle in a turning state. Specifically, when assuming a state where the total demanded damping force F is required to be distributed to the front wheel side of the vehicle, first, the total demanded damping force F is equally distributed to the shock absorbers 11a and 11b.

Subsequently, the suspension ECU 13 adds the distribution amount X to the demanded damping force (F/2) equally distributed to each of the shock absorbers 11a and 11b. At this time, on the basis of the direction (leftward direction) of the lateral acceleration Gl received from the lateral acceleration sensor 14, the suspension ECU 13 adds the distribution amount X of the positive to the demanded damping force (F/2) of the shock absorber 11a on the turn-locus inner side, and adds the distribution amount X of the negative to the demanded damping force (F/2) of the shock absorber 11b on the turn-locus outer side.

That is, a damping force Fi demanded for the shock absorber 11a on the turn-locus inner side, and a damping force Fo demanded for the shock absorber 11b on the turn-locus outer side are represented by the following Eqs. 5 and 6.

$$Fi = (F/2) + X \qquad \text{Eq. 5}$$

$$Fo = (F/2) - X \qquad \text{Eq. 6}$$

Since the distribution amount X is proportional to the magnitude of the lateral acceleration Gl, it can be represented by the following Eq. 7.

$$X = \alpha \cdot (F/2) \qquad \text{Eq. 7}$$

In addition, α represents a variable which changes in proportion to the magnitude of the lateral acceleration Gl and is represented by the following Eq. 8.

$$\alpha = (1 + |Gl| \cdot K) \qquad \text{Eq. 8}$$

where K is a positive variable which may change in accordance with a mode selected by the driver for the roll control performed by the suspension ECU 13; for example, a mode selected from a control mode for giving priority to ride quality and a control mode for giving priority to sporty driving.

Incidentally, on the basis of the above-mentioned Eqs. 5 to 8, there stands a relation in which the damping force Fi demanded for the shock absorber 11a on the turn-locus inner side always assumes a positive value, and the damping force Fo demanded for the shock absorber 11b on the turn-locus outer side always assumes a negative value. Further, when the damping force Fi demanded for the shock absorber 11a on the turn-locus inner side and the damping force Fo demanded for the shock absorber 11b on the turn-locus outer side are added together, the result becomes equal to the total demanded damping force F demanded for the front wheel side. Since the damping forces required on the turn-locus inner side and the turn-locus outer side differ in polarity as described above, the shock absorbers 11a and 11b can generate the damping forces to cause proper rolls, respectively.

That is, since the distribution amount X is calculated by use of the variable α, which changes in proportion to the lateral acceleration Gl, in a state in which the vehicle is turning in the same direction, the demanded damping force Fi of the shock absorber 11a on the turn-locus inner side assumes a positive value with a large absolute value, and the demanded damping force Fo of the shock absorber 11b on the turn-locus outer the shock assumes a negative value with a small absolute value.

Use of the variable α, which changes in proportion to the lateral acceleration Gl, enables the demanded damping forces Fi and Fo of the left and right shock absorbers 11a and 11b to be changed in accordance with the magnitude of the variable α, although the total damping force F demanded for the front wheel side does not change. Accordingly, when the vehicle turns, the shock absorbers 11a and 11b can properly generate damping forces. As a result, the shock absorbers 11a and 11b can generate a proper actual roll angle φ so as to change the actual pitch angle θ generated in the vehicle body to the target pitch angle θa without fail.

The suspension ECU 13 proceeds to step S15 after it distributes the demanded damping force Fi to the shock absorber 11a (shock absorber 11c) on the turn-locus inner side of the vehicle and the demanded damping force Fo to the shock absorber 11b (shock absorber 11d) on the turn-locus outer side thereof.

In step S15, the suspension ECU 13 determines whether or not the vehicle body is in a so called a pitching state; i.e., a state in which the vehicle body vibrates in the vertical direction during a turn, due to the influence (input) of a disturbance from a road surface on which the vehicle travels (hereinafter referred to as a "road surface disturbance"), such as bumps and depressions present on the road surface. This determination will now be specifically described.

As described above, in the state where the vehicle is turning, the suspension ECU 13 computes the total demanded damping force F such that the generation timings of a roll and a pitch generally coincide with each other, and further, divides (distributes) the total demanded damping force F to the damping force Fi of the shock absorber 11a on the turn-locus inner side and the damping force Fo of the shock absorber 11b on the turn-locus outer side, by use of the distribution amount X which is proportional to the generated lateral acceleration Gl, to thereby secure satisfactory maneuvering stability. In this case, as also apparent from the above-described Eqs. 5 and 6, the damping force Fo demanded for the shock absorber 11b on the turn-locus outer side is always smaller than the damping force Fi demanded for the shock absorber 11a on the turn-locus inner side.

Therefore, for example, in a situation where the road surface disturbance is input only to the shock absorber 11a on the turn-locus inner side at the time of turning, pitching (vibration) of the vehicle body in the vertical direction attributable to the input of the road surface disturbance can be quickly suppressed (damped) by means of the large damping force Fi. On the other hand, in a situation where the road surface disturbance is input only to the shock absorber 11b on the turn-locus outer side, the vibration of the vehicle body in the vertical direction attributable to the input of the road surface disturbance may not be quickly suppressed (damped) since the damping force Fo is small. That is, although the damping force Fi demanded for the shock absorber 11a on the turn-locus inner side is enough to suppress (damp) the generated vertical vibration of the vehicle body, the damping force Fo demanded for the shock absorber 11b on the turn-locus outer side may not be enough to properly damp pitching.

Therefore, in step S15, the suspension ECU 13 determines whether or not the vehicle body is in the pitching state as a result of input of a road surface disturbance to the shock absorber 11b (shock absorber 11d) on the turn-locus outer side. Further, if the vehicle body is in the pitching state, the suspension ECU 13 changes the distribution of the total demanded damping force F so as to determine the demanded damping forces Fi and Fo such that the vertical vibration is damped. That is, the suspension ECU 13 receives the vertical acceleration Gvfr (vertical acceleration Gvrr) detected by the vertical acceleration sensors 15b (vertical acceleration sensors 15d) assembled to the vehicle body in the vicinity of the shock absorber 11b (shock absorber 11d) on the turn-locus outer side. The suspension ECU 13 then determines whether or not the absolute value of the vertical acceleration Gvfr (vertical acceleration Gvrr) is equal to or greater than a vertical acceleration Gvs (absolute value) (determination reference value) which has been set in advance for determining the pitching state.

If the absolute value of the vertical acceleration Gvfr (vertical acceleration Gvrr) is determined to be less than the vertical acceleration Gvs (absolute value), the suspension ECU 13 determines "No" and proceeds to step S18. That is, in this case, no road surface disturbance has been input to the shock absorber 11b (shock absorber 11d) on the turn-locus outer side, and thus the vehicle body is not in the pitching state. Therefore, the suspension ECU 13 proceeds to step S18, while maintaining the damping force Fi demanded for the shock absorber 11a (shock absorber 11c) on the turn-locus inner side and the damping force Fo demanded for the shock absorber 11b (shock absorber 11d) on the turn-locus outer side which have been distributed in the above-described step S14.

If the absolute value of the vertical acceleration Gvfr (vertical acceleration Gvrr) is equal to or greater than the vertical acceleration Gvs (absolute value), the suspension ECU 13 determines "Yes" and proceeds to step S16. That is, in this case, a road surface disturbance has been input to the shock absorber 11b (shock absorber 11d) on the turn-locus outer side, and thus the vehicle body is in the pitching state in which it vibrates in the vertical direction. Therefore, the suspension ECU 13 proceeds to step S16 so as to switch, to demanded damping forces for damping the generated vertical vibration of the vehicle body, the damping force Fi demanded for the shock absorber 11a (shock absorber 11c) on the turn-locus inner side and the damping force Fo demanded for the shock absorber 11b (shock absorber 11d) on the turn-locus outer side that have been distributed in the above-described step S14.

Notably, instead of comparing the absolute values of the vertical accelerations Gvfl, Gvfr, Gvrl, and Gvrr detected by the vertical acceleration sensors 15a to 15d with the absolute value of the vertical acceleration Gvs, the determination of the pitching state in step S15 may be performed by determining whether or not, for example, the absolute values of the stroke amounts hfl, hfr, hrl, and hrr detected by the stroke sensors 16a to 16d, or the absolute values of the stroke speeds calculated by differentiating the stroke amounts hfl, hfr, hrl, and hrr are equal to or greater than a stroke amount hs (absolute value) or a stroke speed Vs (absolute value) (determination reference values), which have been set in advance for determining the pitching state. Further, the determination of the pitching state in step S15 may be performed by calculating a frequency of a vertical vibration of the vehicle body by use of the detected vertical accelerations Gvfl, Gvfr, Gvrl, and Gvrr and the detected stroke amounts hfl, hfr, hrl, and hrr, and determining whether or not the calculated vibration frequency is equal to or greater than a reference vibration frequency (determination reference value), which has been set in advance for determining the pitching state.

In step S16, the suspension ECU 13 executes a vibration-suppressing-damping-force computation routine for calculating a damping force Fd needed for suppressing a vertical vibration of the vehicle body which is caused by the influence of a road surface disturbance input to the shock absorber 11b (shock absorber 11d) on the turn-locus outer side (hereinafter, the damping force will be referred to as a "vibration-suppressing damping force Fd"). This vibration-suppressing-damping-force computation routine will now be described in detail. Notably, in the following description as well, similar calculation is performed for both the front wheel side and the rear wheel side. Therefore, the description will be provided for the front-wheel-side left and right shock absorbers 11a and 11b, and for the case where the vehicle makes a leftward turn.

The vibration-suppressing-damping-force computation routine computes the vibration-suppressing damping force Fd needed for suppressing (damping) vibration of the vehicle body corresponding to the sprung portion on the basis of, for example, the sky-hook theory which is well known. Since the sky-hook theory itself is not directly related to the present invention, the description thereof will be omitted.

Figure 6:
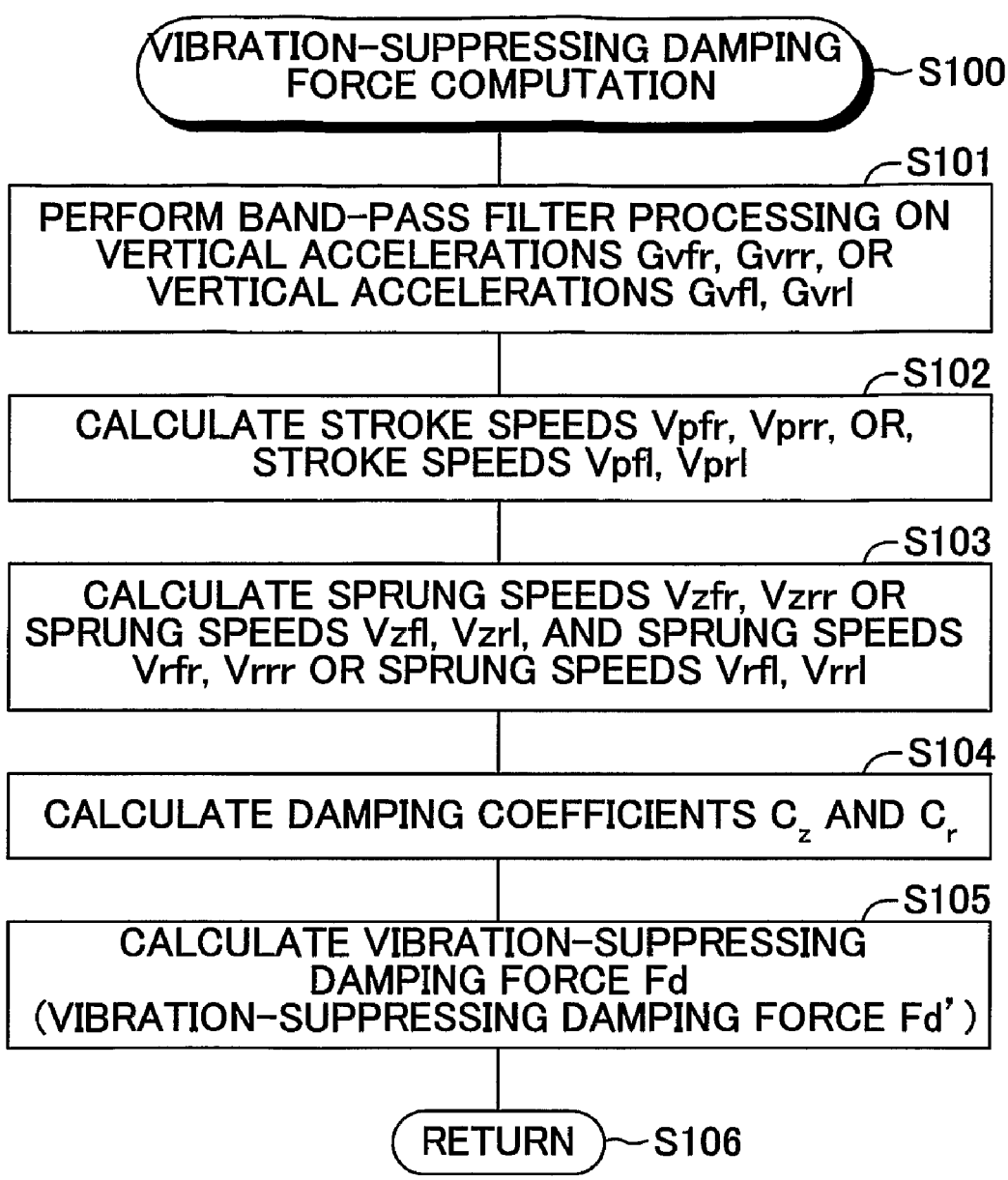
FIG. 6 is a flowchart of a vibration-suppressing-damping-force computation routine executed by the suspension ECU of FIG. 1.

The suspension ECU 13 starts execution of the vibration-suppressing-damping-force computation routine shown in FIG. 6 from step S100. In step S101 subsequent thereto, the suspension ECU 13 executes band-pass filter processing on the vertical acceleration Gvfr (vertical acceleration Gvrr) received from the vertical acceleration sensors 15b (vertical acceleration sensors 15d) in the above-described step S15, by use of two types of band-pass filters (not shown).

Specifically, one band-pass filter permits passage therethrough of only signals in a sprung resonance frequency band among frequency components of the detected vertical acceleration Gvfr (vertical acceleration Gvrr), and the other band-pass filter permits passage therethrough of only signals in a roll resonance frequency band among frequency components of the detected vertical acceleration Gvfr (vertical acceleration Gvrr).

As a result of execution of such band-pass filter processing, only signals in the sprung resonance frequency band and signals in the roll resonance frequency band are input to the suspension ECU 13. Thus, the vertical acceleration Gvfr (vertical acceleration Gvrr) detected by the vertical acceleration sensor 15b (vertical acceleration sensor 15d) assembled on the turn-locus outer side which is actually vibrating in the vertical direction as a result of by input of a road surface disturbance is selectively input to the suspension ECU 13. After execution of band-pass filter processing on the vertical acceleration Gvfr (vertical acceleration Gvrr) corresponding to the turn-locus outer side, the suspension ECU 13 proceeds to step S102.

In step S102, the suspension ECU 13 receives the stroke amount hfr (stroke amount hrr) detected by the stroke sensor 16b (stroke sensor 16d) assembled to the shock absorber 11b (shock absorber 11d) corresponding to the turn-locus outer side, and differentiates, with respect to time, the stroke amount hfr (stroke amount hrr), to thereby calculate a stroke speed Vpfr (stroke speed Vprr). Upon completion of the calculation of the stroke speed Vpfr (stroke speed Vprr), the suspension ECU 13 proceeds to step S103.

In step S103, on the basis of the band-pass filter processing executed in the above-described step S101, the suspension ECU 13 integrates, with respect to time, signals containing frequency components in the sprung resonance frequency band so as to calculate a sprung speed Vzfr (sprung speed Vzrr), and integrate, with respect to time, signals containing frequency components in the roll resonance frequency band so as to calculate a sprung speed Vrfr (sprung speed Vrrr). Upon completion of the calculation of the sprung speed Vzfr (sprung speed Vzrr) and the sprung speed Vrfr (sprung speed Vrrr), the suspension ECU 13 proceeds to step S104.

In step S104, on the basis of the sky-hook theory, the suspension ECU 13 calculate damping coefficients Cz and Cr demanded for the shock absorber 11b (shock absorber 11d) on the turn-locus outer side, by use of the stroke speed Vpfr (stroke speed Vprr) calculated by the computation processing of the above-described step S102 and the sprung speed Vzfr (sprung speed Vzrr) and sprung speed Vrfr (sprung speed Vrrr) calculated by the computation processing of the above-described step S103. That is, the suspension ECU 13 calculates the damping coefficient Cz needed for suppressing vertical vibration of the vehicle body including a sprung resonance frequency component in accordance with the following Eq. 9, and calculates the damping coefficient Cr needed for suppressing vertical vibration of the vehicle body including a roll resonance frequency component in accordance with the following Eq. 10.

$$Cz = Cs \cdot (Vpk/Vzk) \qquad \text{Eq. 9}$$

$$Cr = Cs \cdot (Vpk/Vrk) \qquad \text{Eq. 10}$$

Cs in Eqs. 9 and 10 represents a sky-hook damping coefficient which has been empirically set in advance. Vpk in Eqs. 9 and 10 changes in accordance with the turning direction of the vehicle, and represents the stroke speed Vpfr, Vprr of the shock absorber 11b, 11d (or the stroke speed Vpfl, Vprl of the shock absorber 11a, 11c) on the turn-locus outer side. Vzk in Eq. 9 changes in accordance with the turning direction of the vehicle, and represents the sprung speed Vzfr, Vzrr of the shock absorber 11b, 11d (or the sprung speed Vzfl, Vzrl of the shock absorber 11a, 11c) on the turn-locus outer side. In addition, Vrk in Eq. 10 changes in accordance with the turning direction of the vehicle, and represents the sprung speed Vrfr, Vrrr of the shock absorber 11b, 11d (or the sprung speed Vrfl, Vrrl of the shock absorber 11a, 11c) on the turn-locus outer side. Upon completion of the calculation of the damping coefficients Cz and Cr, the suspension ECU 13 proceeds to step S105.

In step S105, the suspension ECU 13 calculates the vibration-suppressing damping force Fd needed for suppressing the generated pitching state, that is, vertical vibration of the vehicle body. Specifically, the suspension ECU 13 first determines which of the damping coefficients is larger between the damping coefficient Cz and the damping coefficient Cr calculated in the above-described step S104. The suspension ECU 13 then calculates the vibration-suppressing damping force Fd in accordance with the above-described Eqs. 3 and 4, by use of the damping coefficient Cz or the damping coefficient Cr which is larger. Upon completion of the calculation of the vibration-suppressing damping force Fd as described above, the suspension ECU 13 ends execution of the vibration-suppressing-damping-force computation routine in step S106, and subsequently, proceeds to step S17 of the roll control program shown in FIG. 3.

In step S17, the suspension ECU 13 calculates the damping force Fi demanded for the shock absorber 11a (shock absorber 11c) on the turn-locus inner side and the damping force Fo demanded for the shock absorber 11b (shock absorber 11d) on the turn-locus outer side in the pitching state, in accordance with the following Eqs. 11 and 12 in which the vibration-suppressing damping force Fd calculated by executing the above-described vibration-suppressing-damping-force computation routine is used.

$$Fi = F - Fd \quad \text{Eq. 11}$$

$$Fo = Fd \quad \text{Eq. 12}$$

where, F represents the total demanded damping force calculated in the above-described step S13.

Incidentally, when the demanded damping force Fi and the demanded damping force Fo calculated by the above-described Eqs. 11 and 12 are added together in the pitching state, the resultant force becomes equal to the total demanded damping force F, as is the case with an ordinary turning state which is not the above-described pitching state. Accordingly, even in a case where the vehicle body enters a pitching state while the vehicle is turning, the shock absorbers 11a and 11b (or the shock absorbers 11c and 11d) can properly generate damping forces, and can maintain the damping forces so as to render the actual pitch angle θ generated in the vehicle coincident with the target pitch angle θa. Upon completion of the calculation and determination of the demanded damping forces Fi and Fo in the pitching state, the suspension ECU 13 proceeds to step S18.

In step S18, the suspension ECU 13 drives and controls the drive circuits 17a, 17b, 17c, and 17d such that the shock absorbers 11a and 11c on the turn-locus inner side generate the demanded damping force Fi determined in the above-described step S14 or S17, and such that the shock absorbers 11b and 11d on the turn-locus outer side generate the demanded damping force Fo determined in the above-described step S14 or S17. This causes the rotary valves 12a, 12b, 12c, and 12d of the shock absorbers 11a, 11b, 11c, and 11d to change the diameters of the corresponding flow paths for the working fluid. Accordingly, the damping force generated by each of the shock absorbers 11a, 11b, 11c, and 11d coincides with the demanded damping force Fi or the demanded damping force Fo in accordance with the turning direction of the vehicle.

After properly changing the damping forces of the shock absorbers 11a, 11b, 11c, and 11d, the suspension ECU 13 proceeds to step S19 so as to end the current execution of the roll control program, and starts execution of the same program from step S10 after a predetermined short period of time elapses.

As can be understood from the above description, according to the first embodiment, in order to control the roll generated during a turn of the vehicle while synchronizing the phases of the actual roll angle φ and the actual pitch angle θ generated in the vehicle body, the damping forces of the shock absorbers can be controlled in accordance with the magnitude of the lateral acceleration Gl, which changes with the turn of the vehicle, such that the damping force Fi of the shock absorbers 11a and 11c (or the shock absorbers 11b and 11d) disposed on the turn-locus inner side becomes larger than the damping force Fo of the shock absorbers 11b and 11d (or the shock absorbers 11a and 11c) disposed on the turn-locus outer side.

More specifically, in order to control the roll, the suspension ECU 13 calculates the total demanded damping force F to be cooperatively generated by the shock absorbers 11a, 11b, 11c, and 11d disposed on the left and right sides of the front portion of the vehicle body and the left and right sides of the rear portion of the vehicle body, respectively. The suspension ECU 13 then calculates the distribution amount X which is proportional to the magnitude of the absolute value of the lateral acceleration Gl, and adds the calculated distribution amount X to the damping force Fi on the shock absorbers 11a and 11c (or the shock absorbers 11b and 11d) on the turn-locus inner side and subtracts the calculated distribution amount X from the damping force Fo of the shock absorbers 11b and 11d (or the shock absorbers 11a and 11c) on the turn-locus outer side, in which the total demanded damping force F has been equally divided (distributed) to the damping force Fi and the damping force Fo. As a result, the damping force Fi of the shock absorbers 11a and 11c (or the shock absorbers 11b and 11d) disposed on the turn-locus inner side can be made greater than the damping force Fo of the shock absorbers 11b and 11d (or the shock absorbers 11a and 11c) disposed on the turn-locus outer side, while the total demanded damping force F is being generated. Accordingly, since the posture changing behavior of the vehicle during a turn is made constant, the roll can be controlled more accurately, and the maneuvering stability of the vehicle can be improved greatly.

Meanwhile, if a road surface disturbance is input when the vehicle turns in the above-described ordinary turning state, the vehicle body enters a pitching state in which it vibrates in the vertical direction. In particular, the shock absorbers 11b and 11d (or the shock absorbers 11a and 11c) which are controlled to produce a small damping force Fo may not effectively suppress (damp) the generated vertical vibration. Meanwhile, when the suspension ECU 13 determines that the vehicle body is in the pitching state as a result of input of a road surface disturbance to the shock absorber 11b and 11d (or the shock absorber 11a and 11c) on the turn-locus outer side, the suspension ECU 13 calculates the vibration-suppressing damping force Fd for suppressing vertical vibration of the vehicle body, and determines the demanded damping force Fi of the shock absorbers 11a and 11c (or the shock absorbers 11b and 11d) on the turn-locus inner side and the demanded damping force Fo of the shock absorbers 11b and 11d (or the shock absorbers 11a and 11c) on the turn-locus outer side, by use of the vibration-suppressing damping force Fd.

Therefore, it is possible not only to cause the shock absorbers 11a, 11b, 11c, and 11d to cooperatively generate the total demanded damping force F needed for securing satisfactory maneuvering stability of the vehicle, but also to properly secure the damping forces of the shock absorbers 11b and 11d (or the shock absorbers 11a and 11c) on the turn-locus outer side so as to suppress (damp) the generated vertical vibration of the vehicle body extremely effectively and quickly. Accordingly, generation of unnecessary vertical vibration during a turn of the vehicle can be suppressed, and extremely satisfactory maneuvering stability can be secured.

b. Second Embodiment

In the above-described first embodiment, description was provided for the case where the vehicle body is in the pitching state as a result of input of a road surface disturbance only to the shock absorbers 11b and 11d (or the shock absorbers 11a and 11c) on the turn-locus outer side to which the smaller damping force Fo is distributed in a state where the total demanded damping force F is distributed based on the distribution amount X which is proportional to the lateral acceleration Gl. In this case, the demanded damping force Fo of the shock absorbers 11b and 11d (or the shock absorbers 11a and 11c) on the turn-locus outer side is set to be the vibration-suppressing damping force Fz, and the demanded damping force Fi of the shock absorbers 11a and 11c (or the shock absorbers 11b and 11d) on the turn-locus inner side is determined by subtracting the vibration-suppressing damping force Fz from the total demanded damping force F. Thus, the shock absorbers 11b and 11d (or the shock absorbers 11a and 11c) on the turn-locus outer side, to which the road surface disturbance has been input, can generate the proper damping force Fo, while the total demanded damping force F is being generated, whereby unnecessary vertical vibration can be effectively suppressed and satisfactory maneuvering stability is secured.

Meanwhile, when the vehicle during a turn passes through, for example, a bump or a depression extending in the width direction of the road, the vehicle enters a state where a road surface disturbance is input to the shock absorbers 11a, 11b, 11c, and 11d on the turn-locus inner and outer sides in the same phase, in other words, where the vehicle body is vibrating in the vertical direction as a result of input of a road surface disturbance via the left and right shock absorbers 11a and 11b (or the shock absorbers 11c and 11d). In this case, since the left and right shock absorbers 11a and 11b (or the shock absorbers 11c and 11d) with different damping forces suppress the vertical vibration of the vehicle body, a damping mode which is different from that in the above-described first embodiment may occur such that vibration on the turn-locus outer side is not quickly damped although vibration on the turn-locus inner side is quickly damped. Therefore, in the second embodiment, there will be described control of the damping forces of the shock absorbers 11a, 11b, 11c, and 11d for the case where a road surface disturbance is input to the front-wheel-side and rear-wheel-side left and right shock absorbers in the same phase. Notably, for describing the second embodiment, the same portions as those in the above-described first embodiment are denoted by the same reference numerals, and the detailed description thereof will be omitted.

Figure 7:
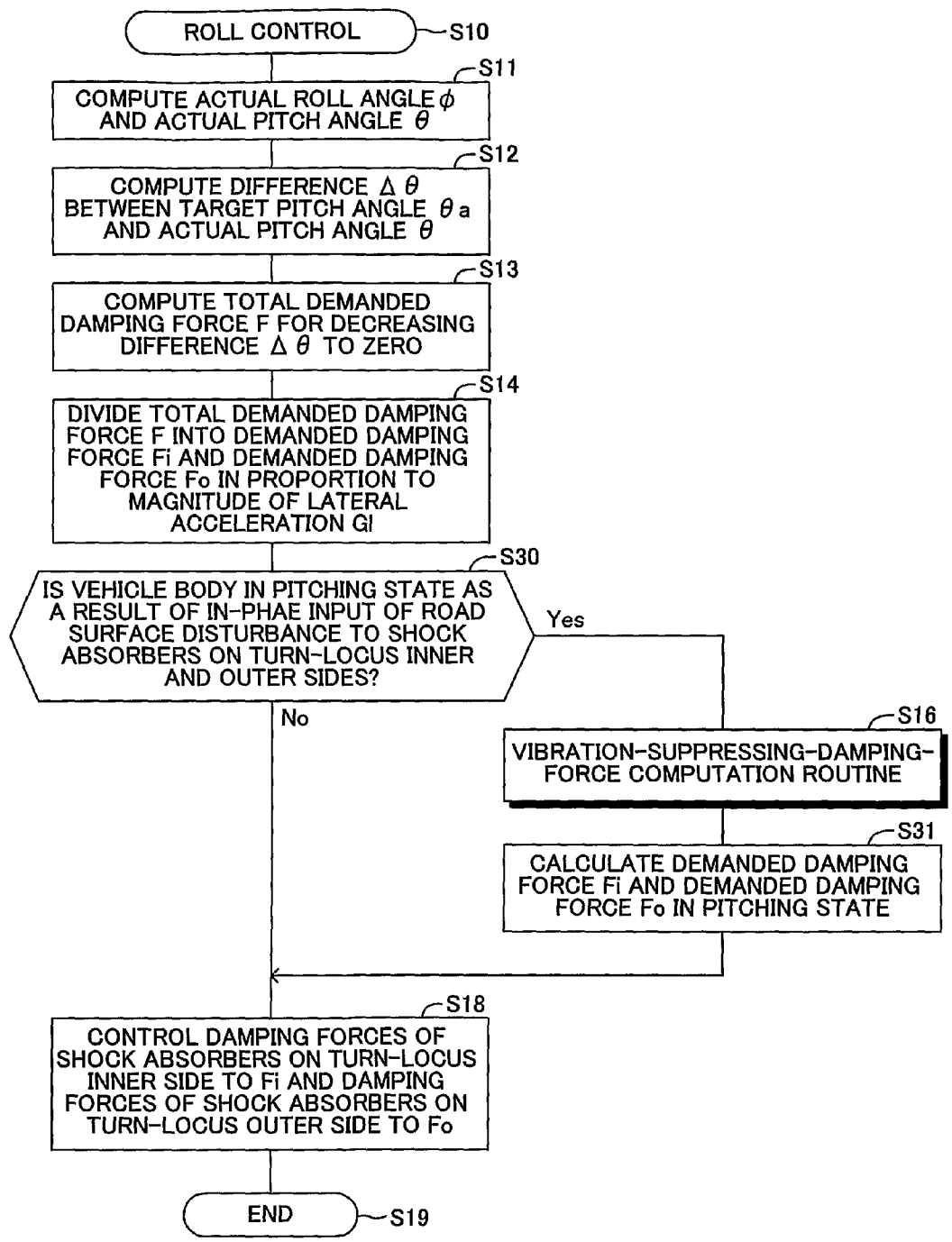
FIG. 7 relates to a second embodiment of the present invention and is a flowchart of a roll control program executed by the suspension ECU of FIG. 1.

In the second embodiment, the suspension ECU 13 executes a roll control program shown in FIG. 7. In the roll control program in the second embodiment, steps S30 and S31 are performed in place of steps S15 and S17 in the roll control program in the above-described first embodiment.

Specifically, the suspension ECU 13 starts execution of the roll control program from step S10, as is the case with the above-described first embodiment, and computes an actual roll angle φ and an actual pitch angle θ generated in the vehicle body in step S11. As is the case with the above-described first embodiment, the suspension ECU 13 then calculates a difference Δθ between the actual pitch angle θ and a target pitch angle θa in step S12, and calculates the total demanded damping force F in step S13. In step S14 subsequent thereto, the suspension ECU 13 executes a distribution computation for distributing the total demanded damping force F between the front-wheel-side left and right shock absorbers 11a and 11b and the rear-wheel-side left and right shock absorbers 11c and 11d. With this operation, the suspension ECU 13 determines the damping force Fi demanded for the shock absorber 11a and 11c (or the shock absorbers 11b and 11d) on the turn-locus inner side and the damping force Fo demanded for the shock absorbers 11b and 11d (or the shock absorbers 11a and 11c) on the turn-locus outer side in the ordinary turning state which is not the pitching state.

Upon the determination of the demanded damping forces Fi and Fo as described above, the suspension ECU 13 determines, in step S30, whether or not the vehicle body is in the pitching state as a result of in-phase input of a road surface disturbance to the left and right shock absorbers 11a and 11b (or the shock absorbers 11c and 11d). In the following description as well, similar calculation is performed for both the front wheel side and the rear wheel side. Therefore, the description will be provided for the front-wheel-side left and right shock absorbers 11a and 11b, and for the case where the vehicle makes a leftward turn.

The processing in step S30 will be described specifically. The suspension ECU 13 receives the vertical acceleration Gvfl and the vertical acceleration Gvfr respectively detected by the vertical acceleration sensors 15a and 15b respectively assembled to the vehicle body in the vicinity of the shock absorber 11a on the turn-locus inner side and the shock absorber 11b on the turn-locus outer side. The suspension ECU 13 then performs, for example, averaging processing on the vertical accelerations GVfl and Gvfr, and determines whether or not the absolute value of the averaged vertical acceleration Gvf is equal to or greater than a vertical acceleration Gvs' (absolute value)(determination reference value) which has been set in advance for determining the pitching state.

If the absolute value of the vertical acceleration Gvf is determined to be less than the vertical acceleration Gvs' (absolute value), the suspension ECU 13 determines "No" and proceeds to step S18. That is, in this case, no road surface disturbance has been input to the shock absorber 11a on the turn-locus inner side or the shock absorber 11b on the turn-locus outer side, and thus the vehicle body is not in the pitching state. Therefore, as is the case with the above-described first embodiment, the suspension ECU 13 proceeds to step S18, while maintaining the damping force Fi demanded for the shock absorber 11a on the turn-locus inner side and the damping force Fo demanded for the shock absorber 11b on the turn-locus outer side which have been distributed in the above-described step S14.

If the absolute value of the vertical acceleration Gvf is equal to or greater than the vertical acceleration Gvs' (absolute value), the suspension ECU 13 determines "Yes", and proceeds to step S16, as is the case with the above-described first embodiment. That is, in this case, a road surface disturbance has been input to the shock absorber 11a on the turn-locus inner side and the shock absorber 11b on the turn-locus outer side in the same phase, and thus the vehicle body is in the pitching state in which it vibrates in the vertical direction. Therefore, as is the case with the above-described first embodiment, the suspension ECU 13 proceeds to step S16 so as to switch, to damping forces for suppressing (damping) the generated vertical vibration of the vehicle body, the damping force Fi demanded for the shock absorber 11a (shock absorber 11c) on the turn-locus inner side and the damping force Fo demanded for the shock absorber 11b (shock absorber 11d) on the turn-locus outer side that have been distributed in the above-described step S14.

Notably, instead of comparing the absolute values of the vertical accelerations GVfl, Gvfr, Gvrl, and Gvrr detected by the vertical acceleration sensors 15a to 15d (more specifically, for example, Gvf and Gvr determined by averaging the left and right vertical accelerations) with the absolute value of the vertical acceleration Gvs', the determination in step S30 in the second embodiment may be performed as follows through comparison. For example, the determination may be performed by determining whether or not the absolute values of the stroke amounts hfl, hfr, hrl, and hrr detected by the stroke sensors 16a to 16d (more specifically, for example, hf and hr determined by averaging the left and right stroke amounts) or the absolute values of the stroke speeds calculated by differentiating the stroke amounts hfl, hfr, hrl, and hrr (more specifically, for example, Vhf and Vhr determined by averaging the left and right stroke speeds) are equal to or greater than a stroke amount hs' (absolute value) or a stroke speed Vs' (absolute value) (determination reference value), which has been set in advance for determining the pitching state. Further, the determination of the pitching state in step S15 may be performed by calculating a frequency of a vertical vibration of the vehicle body by use of the detected vertical accelerations Gvfl, Gvfr, Gvrl, and Gvrr or the detected stroke amounts hfl, hfr, hrl, and hrr, and determining whether or not the calculated vibration frequency is equal to or greater than a reference vibration frequency (determination reference value), which has been set in advance for determining the pitching state.

As is the case with the above-described first embodiment, the suspension ECU 13 then executes the vibration-suppressing-damping-force computation routine in step S16 so as to compute a vibration-suppressing damping force Fd'. Notably, in the second embodiment, a road surface disturbance is input to the shock absorbers 11a and 11b (or the shock absorbers 11c and 11d) on the turn-locus inner and outer sides in the same phase. Therefore, for strict control, in step S101 of the vibration-suppressing-damping-force computation routine, band-pass filter processing is desirably performed on the vertical acceleration GVfl and the vertical acceleration Gvfr received from the vertical acceleration sensors 15a and the vertical acceleration sensors 15b in the above-described step S30.

As described above, however, the demanded damping force Fi on the turn-locus inner side is large enough to quickly damp vertical vibration of the vehicle body, while the demanded damping force Fo on the turn-locus outer side is small and thus it does not quickly damp vertical vibration of the vehicle body. Accordingly, even when a road surface disturbance is input to the shock absorbers 11a and 11b (or the shock absorbers 11c and 11d) on the turn-locus inner and outer sides in the same phase, no problem arises through performance of band-pass filter processing only on the vertical acceleration Gvfr (vertical acceleration Gvrr) detected by the vertical acceleration sensor 15b (or vertical acceleration sensors 15d) disposed on the turn-locus outer side, as in the case of the above-described first embodiment.

As described above, upon completion of the execution of the vibration-suppressing-damping-force computation routine and the computation of the vibration-suppressing damping force Fd' as is the case with the above-described first embodiment, the suspension ECU 13 executes step S31 of the roll control program. In step S31, the suspension ECU 13 determines the damping force Fi demanded for the shock absorber 11a (shock absorber 11c) on the turn-locus inner side and the damping force Fo demanded for the shock absorber 11b (shock absorber 11d) on the turn-locus outer side in the pitching state, in accordance with the following Eqs. 13 and 14, in which the vibration-suppressing damping force Fd' calculated by executing the vibration-suppressing-damping-force computation routine is used.

$$Fi = (F/2) + X - Fd' \quad \text{Eq. 13}$$

$$Fo = (F/2) - X + Fd' \quad \text{Eq. 14}$$

where, F represents the total demanded damping force calculated in the above-described step S13.

Incidentally, when the demanded damping force Fi and the demanded damping force Fo calculated by the above-described Eqs. 13 and 14 are added together in the pitching state in which a road surface disturbance is input to the shock absorbers 11a and 11b (or the shock absorbers 11c and 11d) on the turn-locus inner and outer sides in the same phase, the resultant force becomes equal to the total demanded damping force F, as is the case in the above-described ordinary turning state. Accordingly, even in a case where the vehicle body enters the pitching state during a turn, the shock absorbers 11a and 11b (or the shock absorbers 11c and 11d) can properly generate damping forces respectively, so as to properly damp the vertical vibration, and can maintain the damping forces such that the actual pitch angle θ generated in the vehicle body becomes equal to the target pitch angle θa. Upon completion of the calculation and determination of the demanded damping forces Fi and Fo in the pitching state, the suspension ECU 13 proceeds to step S18, as is the case with the above-described first embodiment.

In step S18, the suspension ECU 13 drives and controls the drive circuits 17a, 17b, 17c, and 17d, such that the shock absorbers 11a and 11c on the turn-locus inner side generate the demanded damping force Fi determined in the above-described step S14 or S31, and such that the shock absorbers 11b and 11d on the turn-locus outer side generate the demanded damping force Fo determined in the above-described step S14 or S31. This causes the rotary valves 12a, 12b, 12c, and 12d of the shock absorbers 11a, 11b, 11c, and 11d to change the diameters of the corresponding flow paths for the working fluid. Accordingly, the damping forces generated by the shock absorbers 11a, 11b, 11c, and 11d coincide with the demanded damping force Fi or the demanded damping force Fo in accordance with the turning direction of the vehicle.

After properly changing the damping forces of the shock absorbers 11a, 11b, 11c, and 11d, the suspension ECU 13 proceeds to step S19 so as to end the execution of the roll control program in the second embodiment.

As can be understood also from the above description, according to the second embodiment, when a road surface disturbance is input to the shock absorbers 11a and 11b (or the shock absorbers 11c and 11d) on the turn-locus inner and outer sides in the same phase during a turn of the vehicle in the above-described ordinary turning state, the vibration-suppressing damping force Fd' for suppressing vertical vibration of the vehicle body can be calculated, and the demanded damping force Fi of the shock absorbers 11a and 11c (or the shock absorbers 11b and 11d) on the turn-locus inner side and the demanded damping force Fo of the shock absorbers 11b and 11d (or the shock absorbers 11a and 11c) on the turn-locus outer side can be determined, by use of the vibration-suppressing damping force Fd'.

Therefore, in the second embodiment as well, it is possible not only to cause the shock absorbers 11a, 11b, 11c, and 11d to cooperatively generate the total demanded damping force F needed for securing satisfactory maneuvering stability of the vehicle, but also to properly secure the damping forces of the shock absorbers 11b and 11d (or the shock absorbers 11a and 11c) on the turn-locus outer side, whereby the generated vertical vibration of the vehicle body can be suppressed (damped) extremely effectively and quickly. Accordingly, generation of unnecessary vertical vibration during a turn of the vehicle can be suppressed, and extremely satisfactory maneuvering stability can be secured.

The present invention is not limited to the above-described embodiments, and the embodiments may be modified in various ways without departing from the scope of the present invention.

For example, in the above-described embodiments, the suspension ECU 13 determines the demanded damping forces Fi and Fo of the shock absorbers 11a, 11b, 11c, and 11d in accordance with the lateral acceleration Gl detected by the lateral acceleration sensor 14, and controls the damping forces. However, the embodiments may be modified such that the suspension ECU 13 determines the demanded damping forces Fi and Fo of the shock absorbers 11a, 11b, 11c, and 11d in accordance with a yaw rate generated in the vehicle, and controls the damping forces. In this case, preferably, there is provided a yaw rate sensor which detects a generated yaw rate, and outputs the detected yaw rate to the suspension ECU 13. Notably, preferably, the yaw rate sensor outputs, as a positive value, a yaw rate generated when the vehicle makes a leftward turn, and outputs, as a negative value, a yaw rate generated when the vehicle makes a rightward turn.

Also in the case where the yaw rate generated in the vehicle is used as described above, the suspension ECU 13 can calculate the distribution amount X by use of a variable $\alpha$, which is proportional to the magnitude of the absolute value of the yaw rate. The suspension ECU 13 then calculates the demanded damping force Fi of the shock absorbers on the turn-locus inner side and the demanded damping force Fo of the shock absorbers on the turn-locus outer side. Thus, effects similar to those attained in the above-described embodiments can be attained.

Further, the embodiments may be modified such that the suspension ECU 13 determines the demanded damping forces Fi and Fo of the shock absorbers 11a, 11b, 11c, and 11d in accordance with the magnitude of the steering angle, which serves as the rotation operation amount of the steering wheel operated by the driver. In this case, preferably, there is provided a steering angle sensor which detects the steering angle, which changes in accordance with the rotation operation of the steering wheel by the driver, and outputs the detected steering angle to the suspension ECU 13. Notably, preferably, the steering angle sensor outputs, as a positive value, a steering angle when the steering wheel is rotated in the counter-clockwise direction so as to turn the vehicle leftward, and outputs, as a negative value, a steering angle when the steering wheel is rotated in the clockwise direction so as to turn the vehicle rightward.

Also in the case where the steering angle of the steering wheel is used as described above, the suspension ECU 13 can calculate the distribution amount X by use of a variable $\alpha$, which is proportional to the magnitude of the absolute value of the steering angle. The suspension ECU 13 then calculates the demanded damping force Fi of the shock absorbers on the turn-locus inner side and the demanded damping force Fo of the shock absorbers on the turn-locus outer side. Thus, effects similar to those attained in the above-described embodiments can be attained.

The invention claimed is:

1. A damping force control apparatus for a vehicle which changes and controls damping forces of shock absorbers disposed between a vehicle body and wheels, the damping force control apparatus comprising:
   a physical quantity detection unit that detects a predetermined physical quantity which changes with a turning of the vehicle;
   a damping-force determination unit that determines damping forces of shock absorbers disposed on a turn-locus inner side and damping forces of shock absorbers disposed on a turn-locus outer side in accordance with the detected predetermined physical quantity such that the damping forces of the shock absorbers disposed on the turn-locus inner side become greater than the damping forces of the shock absorbers disposed on the turn-locus outer side;
   a damping-force control unit that changes and controls the damping forces of the shock absorbers on a basis of the determined damping forces of the shock absorbers disposed on the turn-locus inner side and the determined damping forces of the shock absorbers disposed on the turn-locus outer side;
   a vertical movement determination unit that determines whether the vehicle body is moving in a vertical direction as a result of input of a road surface disturbance during the turning in a state in which the damping forces of the shock absorbers disposed on the turn-locus inner side and the damping forces of the shock absorbers disposed on the turn-locus outer side have been determined by the damping-force determination unit; and
   a vibration-suppressing-damping-force determination unit that determines a vibration-suppressing damping force which is necessary for suppressing the vertical movement of the vehicle body determined by the vertical movement determination unit and which must be generated by at least the shock absorbers disposed on the turn-locus outer side,
   wherein, when the vertical movement determination unit determines that the vehicle body is moving in the vertical direction, the damping-force determination unit subtracts the vibration-suppressing damping force determined by the vibration-suppressing-damping-force determination unit from the determined damping forces of the shock absorbers disposed on the turn-locus inner side, and adds the vibration-suppressing damping force determined by the vibration-suppressing-damping-force determination unit to the determined damping forces of the shock absorbers disposed on the turn-locus outer side to thereby determine the damping forces of the shock absorbers disposed on the turn-locus inner side and the damping forces of the shock absorbers disposed on the turn-locus outer side.

2. The damping force control apparatus for a vehicle according to claim 1, wherein the damping-force determination unit includes:
   a total-damping-force calculation unit that calculates a total damping force which must be cooperatively generated by left and right shock absorbers disposed on a front-wheel side of the vehicle and left and right shock absorbers disposed on a rear-wheel side of the vehicle so as to control a roll generated in the vehicle body as a result of the turning of the vehicle; and
   a total-damping-force distribution unit that distributes the calculated total damping force to the shock absorbers disposed on the turn-locus inner side and the shock absorbers disposed on the turn-locus outer side in accordance with the detected predetermined physical quantity such that the damping forces of the shock absorbers disposed on the turn-locus inner side become greater than the damping forces of the shock absorbers disposed on the turn-locus outer side.

3. The damping force control apparatus for a vehicle according to claim 2, wherein, when the vertical movement determination unit determines that the vehicle body is moving in the vertical direction as a result of input of a road surface disturbance to the shock absorbers disposed on the turn-locus outer side, the total-damping-force distribution unit distributes the total damping force to the shock absorbers disposed on the turn-locus inner side.

4. The damping force control apparatus for a vehicle according to claim 2, wherein the total-damping force distribution unit distributes the calculated total damping force in proportion to the detected predetermined physical quantity such that the damping forces of the shock absorbers disposed on the turn-locus inner side become greater than the damping forces of the shock absorbers disposed on the turn-locus outer side.

5. The damping force control apparatus for a vehicle according to claim 4, wherein the total-damping-force distribution unit equally distributes the calculated total damping force to the shock absorbers disposed on the turn-locus inner side and the shock absorbers disposed on the turn-locus outer side, adds a damping force distribution amount, which is proportional to the detected predetermined physical quantity, to the damping force distributed to the shock absorbers disposed on the turn-locus inner side, and subtracts the damping force distribution amount from the damping force distributed to the shock absorbers disposed on the turn-locus outer side, such that the damping forces of the shock absorbers disposed on the turn-locus inner side become greater than the damping forces of the shock absorbers disposed on the turn-locus outer side.

6. The damping force control apparatus for a vehicle according to claim 2, wherein the total-damping-force calculation unit
computes an actual roll angle and an actual pitch angle generated in the vehicle body,
determines a target pitch angle corresponding to the computed actual roll angle on the basis of a previously set correlation between roll angle and pitch angle,
computes a difference between the determined target pitch angle and the computed actual pitch angle, and
calculates the total damping force such that the computed difference becomes about zero, in order to control the roll generated in the vehicle body while synchronizing the phases of the actual roll angle and the actual pitch angle.

7. The damping force control apparatus for a vehicle according to claim 1, wherein the vertical movement determination unit determines that the vehicle body is moving in the vertical direction on the basis of at least one of a vertical acceleration generated in the vehicle body, stroke amounts of the shock absorbers, and a period of a vertical vibration generated in the vehicle body.

8. The damping force control apparatus for a vehicle according to claim 1, wherein the predetermined physical quantity detected by the physical quantity detection unit is at least one of a lateral acceleration generated as a result of the turning of the vehicle, a yaw rate generated as a result of the turning of the vehicle, and an operation amount of a steering wheel operated by a driver.

9. The damping force control apparatus for a vehicle according to claim 1, wherein each shock absorber includes an electrical actuator which is electrically operated and controlled so as to change the damping force of the shock absorber, and the damping force control unit electrically operates and controls the electrical actuators of the shock absorbers such that the damping forces of the shock absorbers disposed on the turn-locus inner side become greater than the damping forces of the shock absorbers disposed on the turn-locus outer side.

10. The damping force control apparatus for a vehicle according to claim 1, wherein the vertical movement determination unit determines whether the vehicle body is moving in the vertical direction as a result of input of a road surface disturbance during the turn to the shock absorber disposed on the turn-locus outer side, or as a result of an in-phase input of a road surface disturbance during the turn to the shock absorber disposed on the turn-locus inner side and the shock absorber disposed on the turn-locus outer side.

11. The damping force control apparatus for a vehicle according to claim 10, wherein the damping force determination unit determines the damping force of the shock absorber disposed on the turn-locus outer side such that the damping force coincides with the vibration-suppressing damping force determined by the vibration-suppressing-damping-force determination unit, when the vertical movement determination unit determines that the vehicle body is moving in the vertical direction as a result of input of a road surface disturbance during the turn to the shock absorber disposed on the turn-locus outer side.

12. The damping force control apparatus for a vehicle according to claim 1, wherein the vibration-suppressing-damping-force determination unit calculates and determines the vibration-suppressing damping force by use of a larger one of a damping coefficient needed for suppressing a vertical vibration of the vehicle body including a sprung resonance frequency component and a damping coefficient need for suppressing a vertical vibration of the vehicle body including a roll resonance frequency component.

* * * * *